Sept. 28, 1965   H. SCHIEBER ETAL   3,208,498
MOTOR-VEHICLE-TIRE-TRACTION DEVICE
Filed May 28, 1964   2 Sheets-Sheet 1
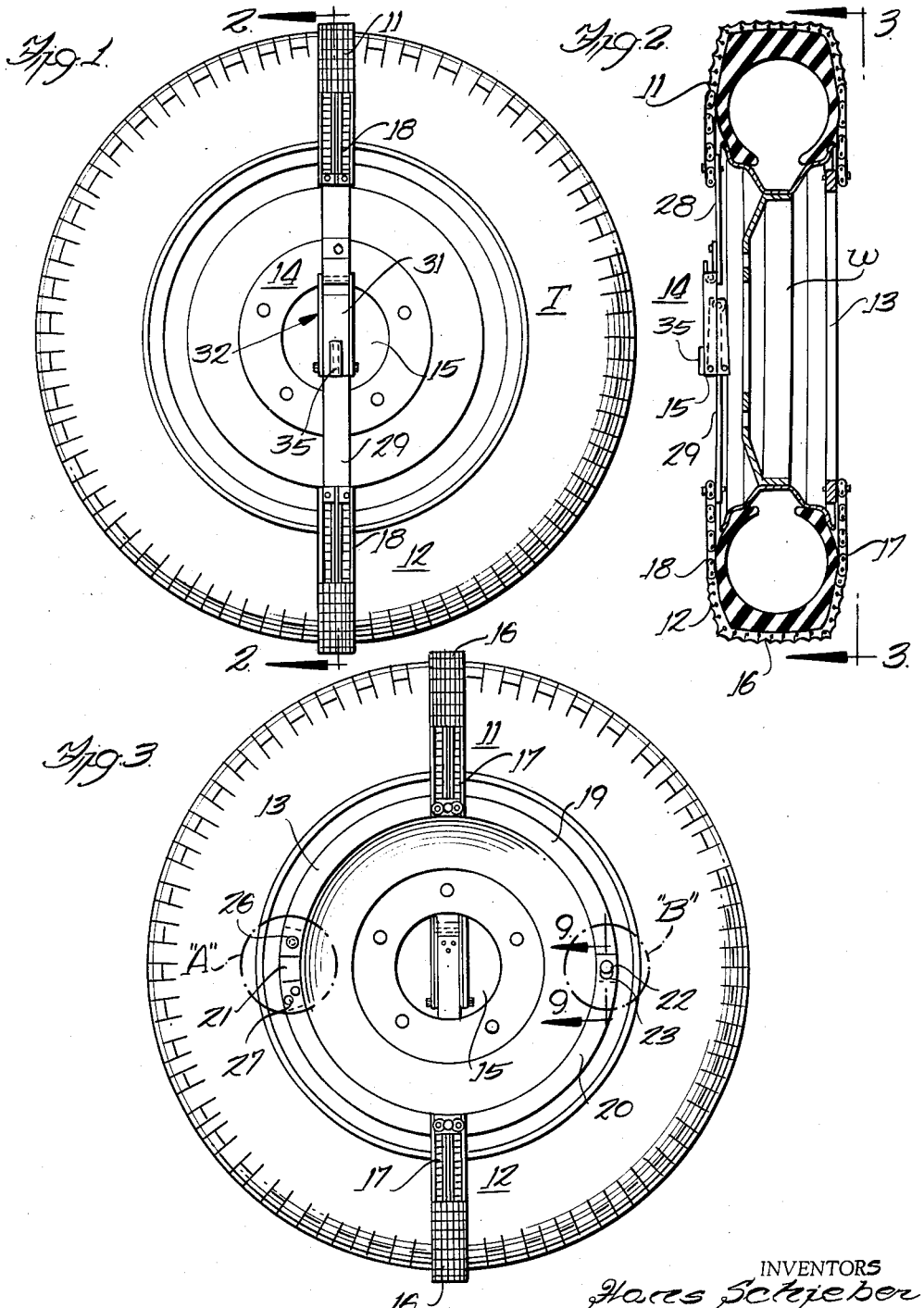
INVENTORS
Hans Schieber
Paul Bredel
by: Rummler and Snow
Attorneys

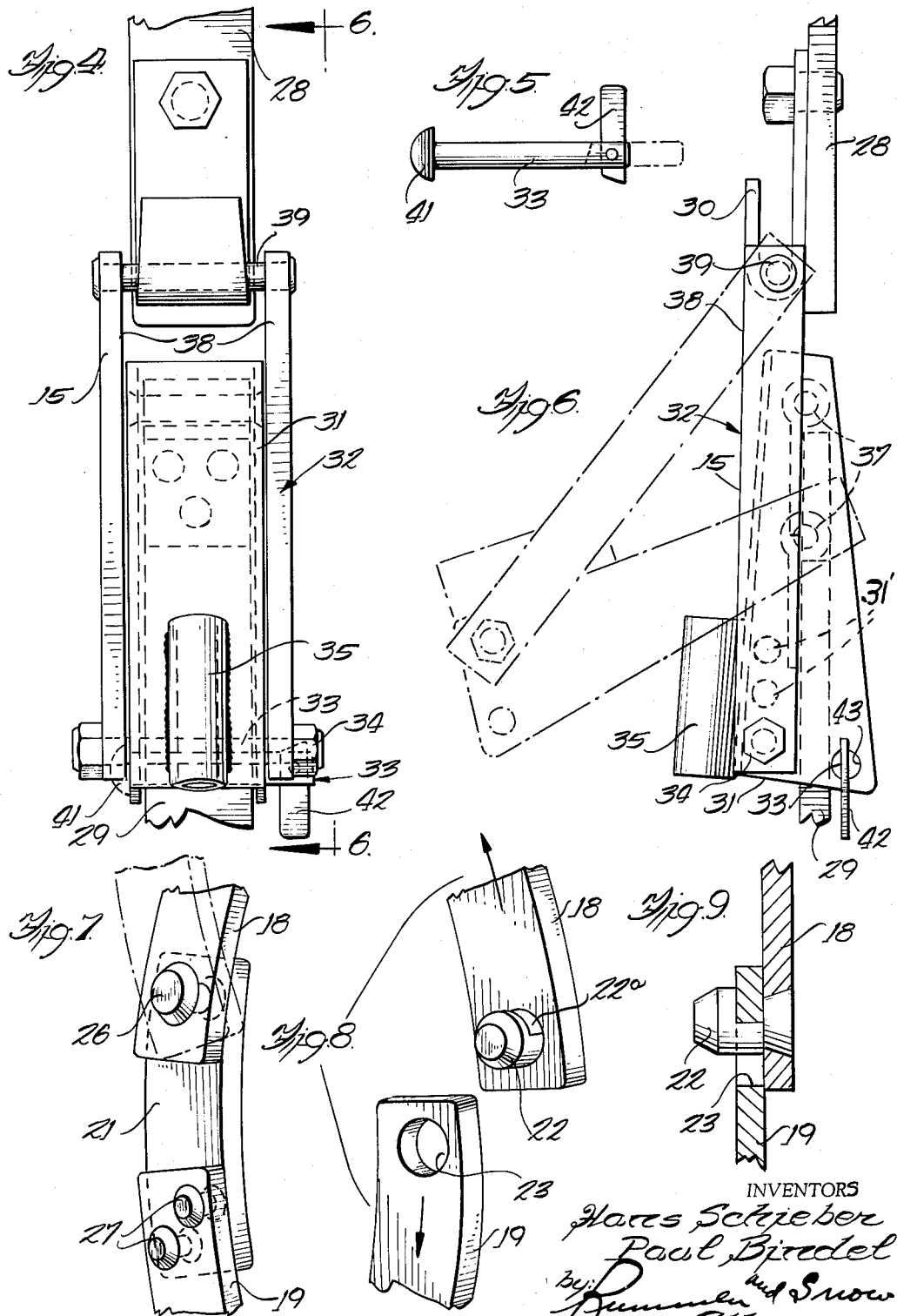

United States Patent Office 3,208,498
Patented Sept. 28, 1965

3,208,498
MOTOR-VEHICLE-TIRE-TRACTION DEVICE
Hans Schieber, 2270 W. Logan Blvd., and Paul Bindel, 3946 W. North Ave., both of Chicago, Ill.
Filed May 28, 1964, Ser. No. 370,898
3 Claims. (Cl. 152—225)

This invention relates to improvements in motor-vehicle tire-traction devices.

The main objects of this invention are; to provide an improved structuring of a tire-traction device for attachment to motor-vehicle wheels to ensure traction on roads presenting slippery conditions; to provide an improved tire-traction device wherein a pair of tread chains are permanently secured at their opposite ends to wheel-spanning connector elements to constitute a complete unitary assembly always ready for instant and facile positioning on a vehicle wheel; to provide an improved tire-traction device of this kind wherein the connector elements are structured for quick positioning in opposed relationship to the opposite faces of a vehicle wheel with the tread chains diametrically embracing the tire preparatory to swinging a toggle latch into position to releasably tension the tread chains over the tire; and to provide an improved tire-traction device of this kind of such simple and practical structure as to make very economical its manufacture and very facile its attachment to and detachment from use position on a tire.

In the adaptation shown in the accompanying drawings;

FIGURE 1 is a front elevational view of a motor-vehicle wheel mounting a tire-traction device constructed in accordance with this invention;

FIG. 2 is a vertical, sectional view of the same taken on the plane of the line 2—2 of FIG. 1;

FIG. 3 is a reverse view to that shown in FIG. 1;

FIG. 4 is an enlarged, fragmentary view showing the toggle latch in its tire-tread clamping position;

FIG. 5 is a detail of one of the parts of the toggle latch;

FIG. 6 is a side view of the parts shown in FIG. 4, taken on the plane of the line 6—6 of FIG. 4 with the toggle latch in broken outline in its partially open position as it is swingable into or out of locking position;

FIG. 7 is an enlarged, fragmentary detail of the parts shown in the circle A of FIG. 3;

FIG. 8 is an enlarged, fragmentary view of the separated parts shown in the circle B of FIG. 3; and FIG. 9 is an enlarged, fragmentary, sectional detail taken on the plane of the line 9—9 of FIG. 3.

The essential concept of this invention involves a pair of tread chains secured at their respective ends to two connector elements adapted for opposed positioning to the opposite faces of a vehicle wheel, one of the connector elements comprising two components adapted for connective embracement of the wheel axle and the other connector element comprising two components spanned by a toggle latch swingable into and out of position for releasably tensioning the tread chains over the tire.

A tire-traction device embodying the foregoing concept comprises a pair of tread chains 11 and 12, pairs of connector elements 13 and 14 and a toggle latch 15.

A set of tread chains 11 and 12 may be of almost any conventional type involving a middle section 16 between a pair of end sections 17 and 18. The form herein shown is substantially the same as that illustrated in Patent No. 2,955,634. In each such tread chain, the middle section 16 is made up of pronged links hinged together in multiple rows and of a length to extend beyond the circumferential edges of the tread section of a tire T. The end sections 17 and 18 are lengths of conventional link sprocket chains, the opposite free ends of which are attached, respectively, to the hereinafter-described pairs of components that constitute the connector elements 13 and 14.

The connector element 13, as herein shown, comprises two semi-circular components 19 and 20 fixed at one end to a connector piece 21 and at their opposite ends having the respective recessed knob 22 and circular slot 23 which permit securing the two components 19 and 20 in or release from circular arrangement, as will be explained presently. The connector component 18, as here shown, is swivelled to the short, arcuate-shaped connector piece 21 by a pivot pin 26, whereas the connector component 19 is fixed to the connector piece 21 by rivets 27. Such a connection of the opposed opposite ends of the components 18 and 19 permits them to be swung apart, when the knob 22 is released from the slot 23, to position the connector element 13 around a vehicle axle. Thereupon the reseating of the knob 22 in the slot 23 forms the ring element 13 for juxtaposed positioning in concentric opposition to the inner face of the vehicle wheel W (FIG. 2).

To these respective components 19 and 20 are attached the extremities of the respective tread chains 11 and 12. Such attachment may be in any acceptable manner and, preferably, is medially intermediate the respective ends of the components 19 and 20 so as to dispose these two tread chains 11 and 12 in diametrical relationship when placed over the tire T on a wheel W, as will be explained presently.

The connector element 14, as here shown, comprises a pair of link bars 28 and 29, preferably, in the form of flat metal strips. These bars 28 and 29 are secured to the extremities of the respective end sections 18 of the tread chains 11 and 12. The link bar 28 mounts an upwardly-open U-shaped clip 30 at its lower end.

The toggle latch 15 comprises the two parts 31 and 32 and a locking pin 33. The two parts 31 and 32 are connected together by a hinge pin 34 and mounts a tool socket 35. The part 31 here is shown as a trapezium-shaped stamping of U-shaped cross-section, which is hinged at 37 to the free end of the link bar 29. The part 32 comprises a pair of flat strips 38 secured at their opposite ends to the hinge pin 37 and to a rod 39 respectively. The rod 39 is adapted for seating in the clip 30 on the link bar 28. The socket 35 is a section of tubing, which is welded to the outer end of the base of the U-shaped latch part 31. The legs of the U-shaped member 31 contain additional spaced aligned apertures 31' whereby hinge pin 34 may be inserted to vary the diameter of the tread chains and connector elements.

The locking pin 33, with a head 41 and a pivoted detent 42, is structured for insertion through aligned holes 43 (FIG. 6), in the lower extremities of the parallel sides of the U-shaped latch part 31. This will position the pin 33 inwardly of the lock bar 29 and ensure retention of the latch parts 31 and 32 in position for retaining the tread chains 11 and 12 in their functioning position on the tire T.

The herein shown tire-traction device is secured in use position on a tire T in the following manner:

With the toggle latch parts 31 and 32 disconnected from the clip 30, to free the tread chains 11 and 12, the knob 22 may be withdrawn from the slot 23. This will permit the two components 19 and 20, of the connector element 13, to be swung apart on the pivot pin 26 so that the components 19 and 20 may be separated enough to set them over the wheel axle. The knob 22 then is re-inserted into the slot 23 to seat the extremity of the component 19 in the recess 22a of the knob 22 (FIG. 8). The tread chains 11 and 12 then are placed over the tread of the tire T. The link bars 28 and 29 are pulled into opposition to permit the latch-part pin 39 to be dropped into the clip 30. A jack rod (or some other rod of appropriate diameter) is inserted into the socket 30. The leverage thus provided permits the toggle latch parts 31 and 32 to be swung down into locking position as shown in FIG. 6. The pin 33, with the detent 42 aligned therewith, is inserted through the holes 43 in the latch part 31. The detent 42 then is allowed to assume a position transverse to the pin axis so as to preclude accidental retraction of the toggle latch 15.

When the traction chain device is to be removed, the detent 42 is positioned in alignment with the pin 33 to permit withdrawal of the pin 33 from the holes 43. Thereupon, with an appropriate rod inserted into the socket 35 the toggle latch parts 31 and 32 may be retracted to permit the removal of the pin 39 from the clip 30. The tread chains 11 and 12 then may be thrown back over the tire T to permit the removal of the knob 22 from the slot 23. The resulting disconnection of the components 19 and 20 will allow the traction device to be removed from the tire.

Although but one specific embodiment of this invention is herein shown and described it will be understood that details of the construction shown may be altered or omitted without departing from the spirit of the invention as defined by the following claims.

We claim:
1. A motor-vehicle tire-traction device comprising,
   (a) a ring-type element composed of
      two semi-circular components with a knob fixed on one end of one of the components and a slot formed in one end of the other component for seating the knob to form a ring of the two components,
   (b) a connector piece
      bonded at one end to the other end of one of the components and swivelled at the other end to other end of the other component,
   (c) a pair of tread chains
      each having one end secured to the respective components intermediate the ends thereof,
   (d) a pair of link bars
      each secured at one end to the other end of the respective tread chains, one of the link bars mounting an upwardly-open U-shaped clip,
   (e) a pair of toggle latch-parts
      hinged together at the respective ends, one of which latch parts is hinged to the free end of the other link bar, and the other of which latch parts mounts a pin at its outer end for seating in the clip, whereby the latch-parts are swingable into and out of position substantially in alignment with the link bars to releasably tension the tread chains over the tire tread.

2. A motor-vehicle tire-traction device as set forth in claim 1 wherein a socket is fixed on one of the toggle latch-parts for the insertion of a tool to apply force to shift the toggle latch-parts into and out of locking relationship.

3. A motor-vehicle tire-traction device as set forth in claim 2 wherein a pin mounting a hinged detent is insertable into holes in the one latch part to retain the latch parts in alignment with the link bars.

References Cited by the Examiner

UNITED STATES PATENTS

| | | | |
|---|---|---|---|
| 1,001,633 | 8/11 | Gaylor | 152—225 |
| 2,450,776 | 10/48 | Achehbach | 152—228 |
| 2,687,760 | 8/54 | Gundalis | 152—226 X |
| 2,738,820 | 3/56 | Browning et al. | 152—225 |
| 3,133,582 | 5/64 | Schieber et al. | |

ARTHUR L. LA POINT, *Primary Examiner.*